United States Patent [19]

Suzuki et al.

[11] Patent Number: 5,072,438
[45] Date of Patent: Dec. 10, 1991

[54] OPTICAL INFORMATION RECORDING DISC AND APPARATUS FOR DRIVING THE DISC

[75] Inventors: Masahiro Suzuki, Ibaraki; Takeo Sonobe, Toride; Koreaki Kurane, Kanagawa; Akira Saito, Odawara, all of Japan

[73] Assignees: Hitachi Maxell, Ltd., Osaka; Hitachi, Ltd., Tokyo, both of Japan

[21] Appl. No.: 330,177

[22] Filed: Mar. 29, 1989

[30] Foreign Application Priority Data

Mar. 29, 1988 [JP] Japan ................................ 63-73414

[51] Int. Cl.⁵ ............................................. G11B 23/03
[52] U.S. Cl. .................................... 369/290; 369/270; 369/289; 360/133
[58] Field of Search ............. 360/99.05, 99.12, 98.04, 360/99.06, 99.03, 99.07, 99.08, 78.13, 71, 93, 96.5, 106, 77.2, 97.03, 133, 86; 369/289, 290, 270, 271, 275, 11, 33–39, 77.2, 112, 111, 93, 63, 65, 67, 77.1, 80, 266, 206, 207, 208, 209, 282

[56] References Cited

U.S. PATENT DOCUMENTS

| | | | |
|---|---|---|---|
| 2,559,786 | 7/1951 | Mueller | 369/271 |
| 2,809,840 | 10/1957 | Mueller | 369/208 |
| 2,809,843 | 10/1957 | Mueller | 369/290 X |
| 2,837,337 | 6/1958 | Mueller | 369/290 X |
| 2,860,880 | 11/1958 | Mueller | 369/290 X |
| 3,003,771 | 10/1961 | Mueller | 369/290 X |
| 4,061,341 | 12/1977 | Kaplan | 369/289 X |
| 4,514,839 | 4/1985 | Eisemann | 369/270 |
| 4,570,194 | 2/1986 | Schatteman | 369/270 X |
| 4,618,951 | 10/1986 | Okita et al. | 369/270 |
| 4,631,620 | 12/1986 | Oishi et al. | 360/133 |
| 4,649,531 | 3/1987 | Horowitz et al. | 369/270 |
| 4,768,185 | 8/1988 | Camerik | 369/270 |
| 4,783,717 | 11/1988 | Zeeman | 369/266 |
| 4,791,624 | 12/1988 | Stinesen | 369/270 |
| 4,802,158 | 1/1989 | Ogusu | 360/290 X |
| 4,823,337 | 4/1989 | Van Zanten et al. | 360/99.12 X |

FOREIGN PATENT DOCUMENTS 60-10450 5/1985 Japan .
61-80650 8/1986 Japan .

*Primary Examiner*—Paul Ip
*Attorney, Agent, or Firm*—Birch, Stewart, Kolasch & Birch

[57] ABSTRACT

An optical information recording disc having at least one substrate for recording/reproducing information through an optical unit wherein a spindle hole, through which a spindle is provided as a disc drive system, is formed in a central portion of the substrate and an engagement member engageable with a disc engagement member integrally formed with the spindle, is formed around the central portion.

27 Claims, 10 Drawing Sheets

OPTICAL INFORMATION RECORDING DISC AND APPARATUS FOR DRIVING THE DISC

BACKGROUND OF THE INVENTION

1. Field of the Invention

The present invention relates to an optical information recording disc and a disc drive apparatus, and more particularly to an engagement device for transmitting the power of a spindle provided within a disc drive apparatus to an optical information recording disc without fail.

Description of Related Art

There have been known two kinds of clamping systems for optical information recording discs, i.e., a mechanical clamp system and a magnetic clamp system.

In the mechanical clamp system, as shown in FIG. 22, a clamp member 42 is disposed so as to confront a spindle 41, and an optical information recording disc 43 is loaded on the spindle 41. Thereafter, the clamp member 42 is lowered to press the optical disc 43 by a spring force of a spring 44.

On the other hand, in the magnetic clamp system, as shown in FIG. 23, a magnet 46 is embedded in a turntable 45 formed integrally with a spindle 41, and magnetic members 47 are disposed close to a central portion of an optical information recording disc 43, so that the optical disc 43 is clamped by a magnetic attraction force between the magnet 46 and the magnetic members 47.

In the mechanical clamp system of the conventionally well known clamp systems, it is necessary to provide the clamp member 42 and a member for driving the clamp member. As a result, the disc drive mechanism becomes expensive. Also, since it is necessary to provide a large space for the arrangement of the clamp member 42 and the like, the disc driving device is enlarged in size.

The magnet clamp system does not suffer from the above-described disadvantages. However, in the magnetic clamp system, since the optical information recording disc 4 is clamped only by the magnetic attraction force between the magnet 46 and the magnetic member 47 and the friction between the turntable 45 and the magnetic members 47, the clamping force is relatively weak. As a result, when the spindle 41 is started to be operated at a high speed or when the optical disc 43, lacking dynamic balance, is driven rotatably at a high speed, undesired slippage occurs between the optical disc 43 and the turntable 45, so that a rotation jitter is increased to cause a recording/reproducing error or to cause a data transfer speed to be lowered.

Accordingly, in the technical field of the optical information recording disc and the disc driving apparatus, is important to the above-described technical disadvantages.

SUMMARY OF THE INVENTION

In order to overcome the above-noted defects, an object of the present invention is to provide a compact disc, a drive apparatus for rotatably driving an optical information recording disc at a high speed, and an optical information recording disc applicable to the drive apparatus.

In order to attain the object, the present invention is characterized in that a substrate or base where information is recorded/reproduced by optical means has a spindle hole, into which in the disc drive apparatus is inserted and a disk engagement means formed integral with a spindle means at an outer peripheral portion thereof which engages an engagement means formed integral with the disc.

In addition, according to the invention, a disc engagement means, engageable with an engagement means provided in the central portion of the optical disc, is formed on in the spindle for rotatably driving the optical information recording disc.

As described above, when the optical information recording disc and the spindle are engaged with each other through mechanical engagement means, there is no slippage therebetween even during the application of a large torque. It is, therefore, possible to start the rotation of the optical information recording disc at a high speed or rapidly and to rotatably drive the disc at a high speed. Thus, it is possible to increase the data transfer speed and to reduce errors in recording/reproducing the information.

DESCRIPTION OF THE PREFERRED EMBODIMENTS

The present invention will now be described by way of examples with reference to the accompanying drawings which are not intended to limit the subject matter of the present invention.

Figure 1:
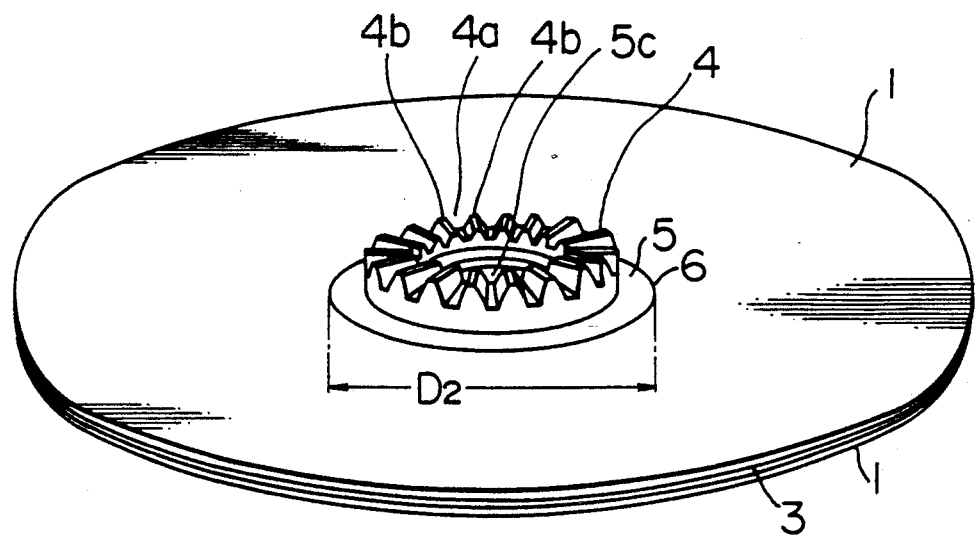
FIG. 1 is a perspective view showing an optical information recording disc according to a first embodiment of the invention.

An optical information recording disc according to a first embodiment of the invention will now be described with reference to FIGS. 1 and 2. FIG. 1 is a perspective view showing the optical information recording disc according to the invention, and FIG. 2 is a cross-sectional view of the disc.

Figure 2:
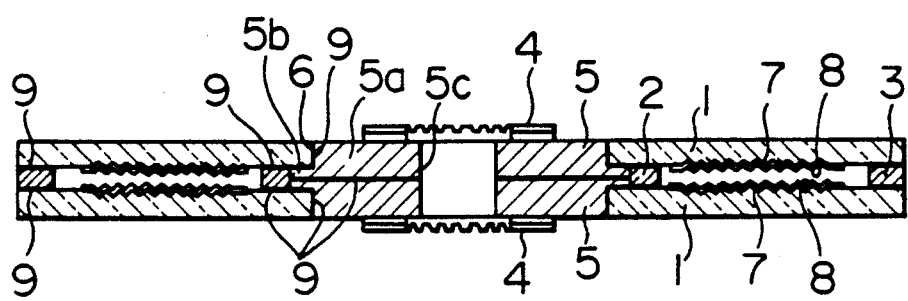
FIG. 2 is a cross-sectional view showing the disc shown in FIG. 1.

As shown in FIGS. 1 and 2, a pair of substrates 1 are bonded to each other through an inner circumferential spacer 2 and an outer circumferential spacer 3. A hub 5 is provided integrally with a crown gear 4 in a central portion of the disc assembly.

The pair of substrates 1 are made of a transparent ceramic, such as glass, or a transparent resinous material, such as polycarbonate (PC), polymethylmethacrylate (PMMA), polymethylpentene, and epoxy and are provided at their center with centers holes 6. In an inner surface of each substrate 1, there are formed signal patterns 7, such as guide grooves for optical spots and signal-modulated prepits arrangement. A recording film or reflecting film 8 is formed on the signal pattern 7.

A suitable method is selected for forming the signal pattern 7 in accordance with the kind of material of the substrates 1.

For example, in the case where the substrate 1 is formed of a thermoplastic resin, such as PC, PMMA and polymethylpentane, a so-called injection-molding method including a step of injecting a molten material for the substrate into an injection molding die to integrally form the substrate 1 and the signal patterns 7, is preferable. With respect to this substrate material, a so-called compression molding method or injection-compression molding method in which, after the molten material has been injected into the injection molding die, a pressure is applied thereto, may be used. These methods are known in the art. In the case where the substrate 1 is made of ceramic such as glass or a thermosetting resin such as an epoxy, a so-called 2P method (photopolymerization method) is suitable in which a photopolymerizable resin is spread between the substrate 1 and a stamper (die) having a reversed or negative pattern for a desired signal pattern to transfer the reversed pattern of the stamper to the substrate. Also, in the case of the thermosetting resin such as epoxy, it is possible to employ a so-called injection molding method in which the substrate material, kept under the molten condition, is statically poured into the mold to integrally form the substrate 1 and the signal pattern 7 together.

A recording film or layer 8 may be made of a desired heat mode material in accordance with the kind of optical information recording disc. For example, in the case of the rewritable type of optical information recording disc, the recording film 8 is formed of low melting point alloy typically such as tellurium-selenium alloy, or an organic dye material such as cyanine or phthalocyanine system organic dye. Also, in the case of an erasable optical information recording disc, the recording film is formed of a magnetic optical recording material, typically such as an amorphous alloy composed mainly of terbium, iron and cobalt or phase-changeable recording material typically such as an amorphous alloy made mainly of indium and selenium.

In the case where the optical information recording disc is of the read-only type, a reflecting film or layer is deposited instead of the recording film. For example, the reflecting film may be made of aluminum.

These recording films or reflecting films 8 may be formed by conventional thin film deposition methods, such as sputtering, vacuum-evaporation, ionplating, plasma deposition, non-electrolyte plating or the like.

The inner and outer circumferential spacers 2 and 3 are made of metallic or resinous material and are in the form of rings having desired inner and outer diameters. The inner and outer circumferential spacers 2 and 3 are bonded to the inner surfaces of the substrates 1 through adhesives 9. It is possible to use conventional adhesives as the desired adhesives 9. However, it is preferable to use photopolymerizable adhesives or hot-melt adhesives.

The hub 5 is constituted by a base portion 5a having such an outer diameter that the base portion 5a can be inserted into the center hole 6 of the substrate 1 and the height that is substantially equal to a thickness of the substrate 1, and a flanged portion 5b having an outer diameter that is larger than the diameter of the center hole 6 and a thickness that is substantially half the thickness of the inner and outer circumferential spacers 2 and 3. A spindle hole 5c is formed through the central portion of the hub 5.

The hub 5 is made of wear-resistant, magnetic metal. A hub 5 may be made of magnetic material such as soft iron, ferrite or martensite system stainless steel. It is more preferable to use stainless steel SUS 430 under JIS standards, which has a rust-proof or anticorrosive property and is available in the market relatively cheap.

The base portion 5a is inserted into the center hole 6 from the inside of the substrate 1. The outer surface of the base portion 5a and the inner circumferential surface of the center hole 6 are bonded to each other, and the upper surface of the flanged portion 5b and the inner surface of the substrate 1 are bonded to each other by means of the adhesives 9, thereby setting the hub 5 onto the central portion of the substrate 1. The adhesive may be the same as that used to bond the substrate 1 with the spacers 2 and 3.

The crown gear 4 is formed coaxially with the spindle hole 5c on an outer surface of the base 5a of the hub 5. The crown gear 4 may be integrally formed with the hub 5 or otherwise may be formed separately from the hub 5 and then bonded to the hub 5 with an adhesive or the like. In the case where the crown gear 4 is formed separately, it may be made of a resin.

In order to reduce a slippage between the crown gear 4 and an associated crown gear formed on a turntable of the disc drive apparatus to be engaged therebetween during a period from a moment when the crown gear 4 comes into contact with the associated crown gear to a moment when the engagement therebetween has been completed, it is preferable to increase the number of the teeth of the crown gears to be as many as possible. Also, since the crown gear 4 is not engaged with a pinion for the power transmission, there is no slippage after completion of the engagement. Therefore, the tooth configuration is not limited to an involute gear tooth or a cycloid gear tooth but may be modified to a rectangular, triangular and mountain-like configuration or the like.

A disc drive apparatus for rotatably driving an optical information recording disc in accordance with the first embodiment and a method for driving the disc in the disc drive apparatus will be explained with reference to FIGS. 3 and 4.

Figure 3:
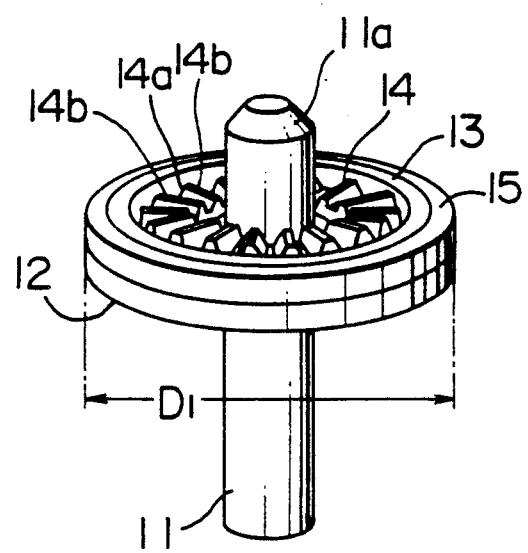
FIG. 3 is a perspective view showing a disc drive system for the disc shown in FIG. 1.

As shown in FIG. 3, a disc drive system is built in the disc drive apparatus. The disc drive system is composed of a spindle 11 connected to a disc drive motor (not shown) and a turntable 12 securely fixed near an end portion of the spindle 11.

The spindle 11 has such an outer diameter that the spindle 11 may be fitted by a certain pressure into the spindle hole 5c formed in the hub 5. The distal end portion of the spindle 11 is chanfered at 11a for easy insertion of the spindle into the spindle hole 5c.

The turntable 12 is disposed somewhat below the top end of the spindle 11, and has an outer diameter D1 substantially the same as an outer diameter D2 of the base portion 5a of the hub 5. A disc receiver 13 is projected somewhat inside of an outer circumference of the turntable from an upper surface of the turntable 12. The upper surface of the disc receiver 13 is located just below a lower edge of the chanfered portion 11a formed at the distal end portion of the spindle 11.

A crown gear 14 for engagement with the crown gear 4 is formed in confrontal relation of the crown gear 4 on the upper surface of the turntable 12. As a matter of course, the crown gear 14 is formed coaxially with the spindle 11. A magnet 15 is mounted along the outer circumference of the disc receiver 13 formed on the upper surface of the turntable 12.

When the optical information recording disc in accordance with the first embodiment is loaded in the disc drive apparatus provided with the above-described disc drive system, first of all, the disc is moved toward the turntable 12 by gravitational force and the magnetic force applied between the hub 5 and the magnet 15 provided in the turntable 12. As a result, the distal end portion of the spindle 11 is inserted into the spindle hole 5c formed in the hub 5.

Figure 4:
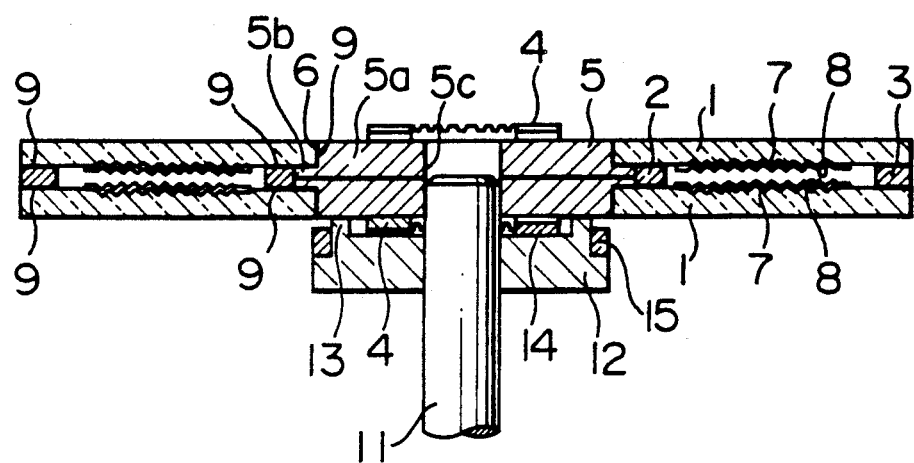
FIG. 4 is a sectional view showing an engagement between the disc and the disc drive system according to the embodiment.

Under such a condition, assuming that grooves 4a between the teeth of the crown gear 4 formed in the hub 5 are completely in alignment with teeth 14b of the crown gear 14 formed in the turntable 12, and the teeth 4b of the crown gear 4 are in complete alignment with the grooves 14a between the teeth of the crown gear 14, as shown in FIG. 4, the engagement between the two crown gears 4 and 14 is completed immediately after the insertion of the spindle 11 into the spindle hole 5c. Accordingly, it is possible to drive the optical disc by rotating the spindle 11.

On the other hand, if the grooves 4a between the teeth of the crown gears 4 are out of alignment with the teeth 14b of the crown gear 14, at the stage when the distal end portion of the spindle 11 has been inserted into the spindle hole 5c, the two crown gears 4 and 14 are in abutment with each other at their peak portions. In this case as the spindle 11 is rotated, slippage is generated between the peak portions of the crown gears 4 and 14. At a moment when the grooves 4a between the teeth 4b of the crown gear 4 are in alignment with the teeth 14b of the crown gear 14, the engagement between the two crown gears 4 and 14 is completed.

In the first embodiment for the optical information recording disc and the disc drive apparatus, since the rotational force of the spindle 11 is transmitted to the disc through the mechanical engagement between the crown gears 4 and 14, even if the spindle 11 is started at a high speed or the disc, that is somewhat defective in dynamic balance, is rotated at a high speed, there is no fear that substantial slippage between the spindle 11 and the optical disc would occur. Accordingly, it is possible to provide an optical information recording system in which the data transmission speed is high and error in recording/reproducing due to jitter in rotation is suppressed.

A second embodiment of the invention will now be described with reference to FIGS. 5 through 7. The second embodiment is characterized in that an engagement pin is provided in the disc drive system of the disc drive apparatus. The optical information recording disc used in this embodiment is the same as that used in the first embodiment.

Figure 5:
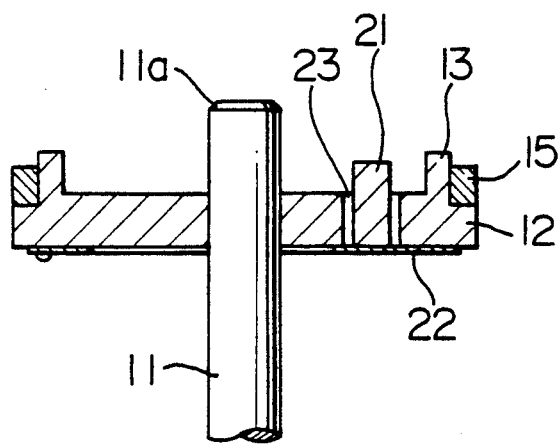
FIG 5 is a sectional view showing a disc drive system according to a second embodiment of the invention.
Figure 6:
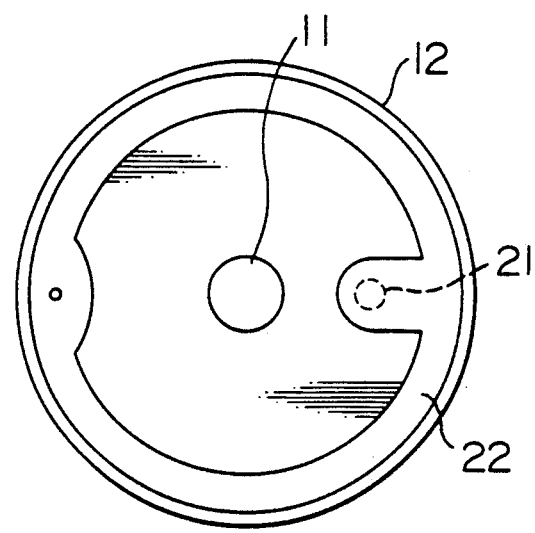
FIG. 6 is a bottom view of the disc drive system shown in FIG. 5.

FIG. 5 is a sectional view showing a drive system in the disc drive apparatus in accordance with the second embodiment. FIG. 6 is a bottom view showing the drive system, and FIG. 7 is a sectional view showing the apparatus in the operating condition. In FIGS. 5 to 7, there are seen an engagement pin, 21 a spring member and a through-hole 23. In the second embodiment, the same reference numerals are used to indicate the like components or members as shown in FIGS. 1 through 4.

The engagement pin 21 is formed in such a size and a configuration that the pin 21 is insertable into a groove 4a between teeth 4b of the crown gear 4 provided in the disc. As shown in FIG. 7, the pin 21 is fixed to an end of the spring member 22 in the form of a ring. The engagement pin 21 is inserted from the back side of the turntable 12 into the through hole 23 as shown in FIG. 5, with its distal end being projected beyond the surface of the turntable 12.

The spring member 22 is mounted on the turntable 12 by fixing the opposite end thereof by means of the engagement pin 21 to the back surface of the turntable 12.

The penetrating hole 23 is formed at a position corresponding to the groove 4a between the teeth 4b of the crown gear 4.

Figure 7:
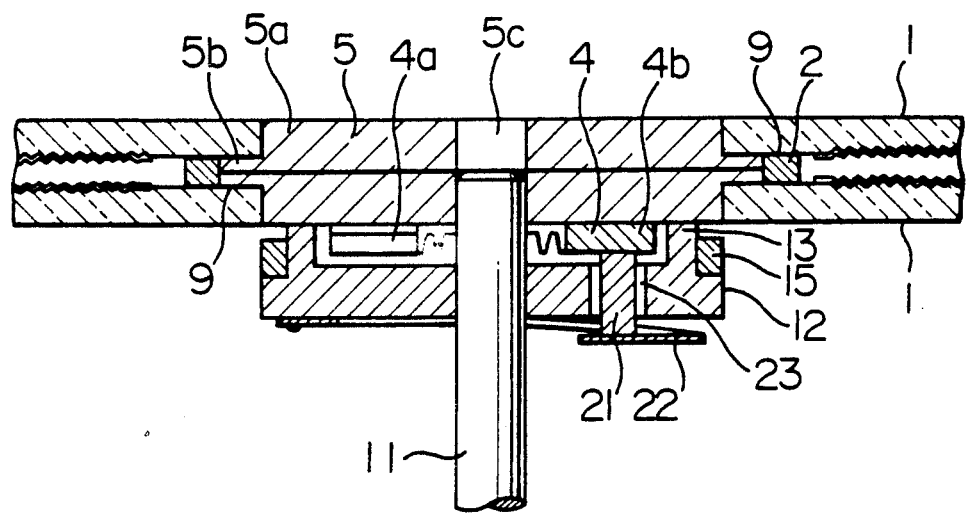
FIG. 7 is a sectional view showing the engagement between the disc and the disc drive system according to the second embodiment.

In the disc drive system according to the second embodiment, if the engagement pin 21 is out of alignment with the groove 4a between the teeth 4b of the crown gear 4 upon the loading of the disc, as shown in FIG. 7, the engagement pin 21 is retracted back into the through hole 23 with the pin 21 being pressed by the hub 5. Then, as the spindle 11 is rotated, a slippage is generated between the peak portion of the tooth 4b of the crown gear 4 and the engagement pin 21. When the groove 4a between the teeth 4b of the crown gear 4 and the engagement pin 21 are in alignment with each other, the engagement pin 21 is inserted into the groove 4a of the crown gear 4 by the action of the resilient force of the spring member 22, thereby completing the engagement therebetween.

The disc drive system according to the second embodiment has the same advantages as those of the first embodiment. In addition, the following advantages may be enjoyed according to the second embodiment. (i) It is possible to dispense with the expensive crown gear, to reduce the cost for the disc drive system. (ii) It is possible to reduce powder due to wear in comparison with the engagement of the two crown gears. (iii) Since the engagement pin 21 is provided to be insertable into the through hole 23, irrespective of whether the groove 4a between the teeth 4b of the crown gear 4 and the engagement pin 21 are in alignment with each other or not, it is possible to rapidly locate in place the disc on a disc receiver 13 of the turntable 12, thereby increasing the stability of the disc.

A third embodiment of the invention will now be described with reference to FIGS. 8 to 10. The embodiment is characterized in that two engagement pins are provided in the drive system for driving an optical information recording disc. The disc used in the first embodiment is used in the third embodiment.

Figure 8:
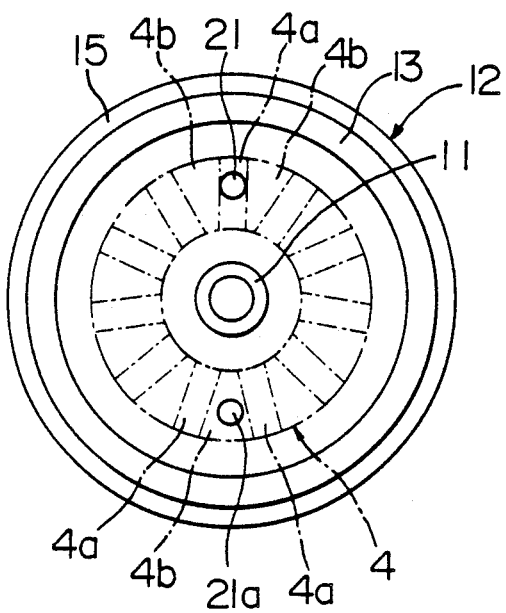
FIGS. 8 and 9 are plan views showing disc drive systems according to a third embodiment of the invention.
Figure 9:
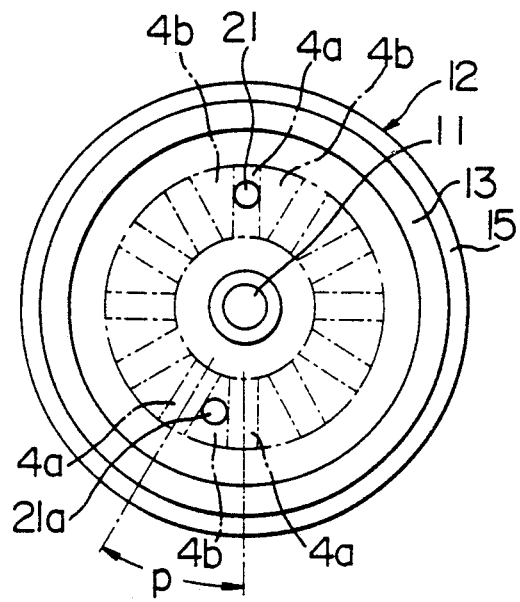

FIGS. 8 and 9 are plan views showing the disc drive system in accordance with the third embodiment. FIG. 10 is a sectional view showing the apparatus in the operating condition. In FIGS. 8 to 10, reference characters 21 and 21a denote engagement pins. The same reference characters used in FIGS. 1 through 7 are used to indicate the like components or members.

The engagement pins 21 and 21a are both formed in such a size and a configuration that the pins are insertable into the grooves 4a between the teeth 4b of the crown gear 4 provided in the disc, respectively. As shown in FIG. 10, the pins 21 and 21a are fixed to a spring member 22 in the form of a ring. As shown in FIG. 10, the engagement pins 21 and 21i a are inserted into through holes 23 from a back surface of the turntable 12 with distal ends thereof being projected beyond the surface of the turntable 12.

As shown in FIGS. 8 and 9, the two engagement pins 21 and 21a are arranged so that when one of the engagement pin 21 is located at a position corresponding to the groove 4a between the teeth 4b of the crown gear 4, the other engagement pin 21a is located at a position corresponding to the tooth 4b of the crown gear 4. Namely, if the number of the teeth 4b of the crown gear 4 (or the number of the grooves between the teeth) is an odd number, as shown in FIG. 8, the two engagement pins 21 and 21a are arranged in a symmetrical manner with respect to the spindle 11. Also, if the number of the teeth (or the grooves between the teeth) of the crown gear 4 is an even number, as shown in FIG. 9, one of the engagement pins 21a is arranged at a position offset by half a pitch p of the teeth 4b of the crown gear 4 from the symmetrical position with respect to the spindle 11.

In such an arrangement, it is possible to engage one of the engagement pins 21, 21a with the grooves 4a between the teeth 4b of the crown gear 4 only by rotating the turntable 12 by half the pitch p of the teeth 4b of the crown gear 4. As a result, the wear of the engagement pins 21 and 21a and the crown gear 4 may be minimized. Thus, the adverse effect of the wear powder may be negligible.

Figure 10:
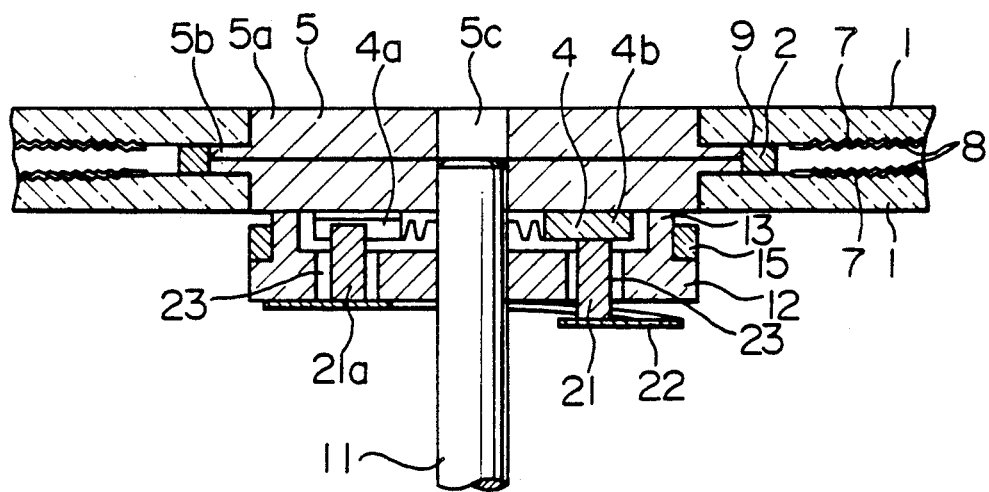
FIG. 10 is a sectional view showing an engagement between the disc and the disc drive system according to the third embodiment.

The other engagement pin that is not inserted into the groove 4a between the teeth 4b of the crown gear 4 is retracted into the through hole 23 by the tooth 4b of the crown gear 4 as shown in FIG. 10.

The other structure of the drive system according to the third embodiment provides the same effects as those as in the first and second embodiments.

Figure 11:
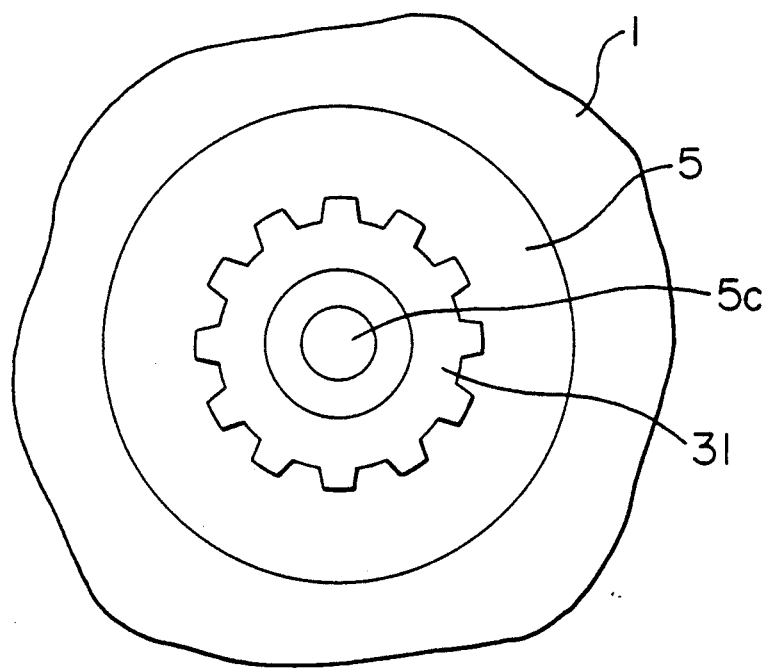
FIG. 11 is a plan view showing an optical information recording disc in accordance with a fourth embodiment.

A fourth embodiment of the invention will now be described with reference to FIGS. 11 and 12. FIG. 11 is a plan view of an optical information recording disc in accordance with the fourth embodiment, and FIG. 12 shows a plan view of a disc drive system applied to the apparatus.

As shown in FIG. 11, the disc according to the fourth embodiment is characterized in that a spur gear 31 is provided in a hub 5 as an engagement means with the disc drive system. The other components are the same as those as in the first embodiment. The like components or members are designated by the same reference numerals and the explanation therefor will be omitted.

Figure 12:
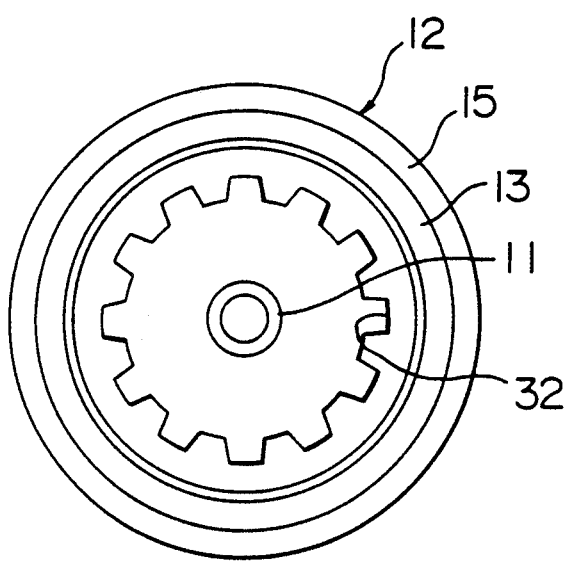
FIG. 12 is a plan view of a disc drive system for the optical disc according to the fourth embodiment.

On the other hand, an internal gear 32 that is engageable with the spur gear 31 is provided in the turntable 12 in the disc drive system for rotatably driving the optical disc, as shown in FIG. 12.

The disc and the disc drive apparatus in accordance with the fourth embodiment may ensure the same advantages a those in the first embodiment.

In addition, the disc drive systems in accordance with the second and third embodiments may be applied to the optical disc according to the fourth embodiment.

Figure 13:
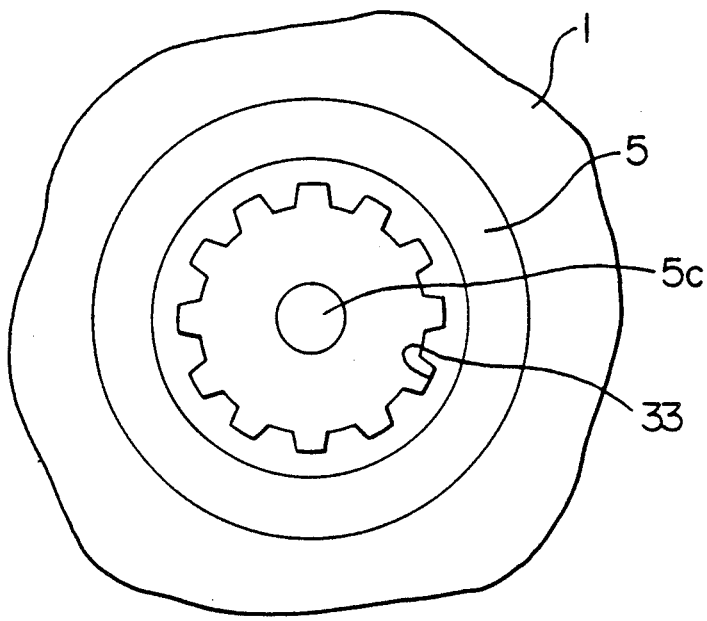
FIG. 13 is a plan view showing an optical information recording disc according to a fifth embodiment.

A fifth embodiment of the invention will now be described with reference to FIGS. 13 and 14. FIG. 13 is a plan view of an optical information recording disc in accordance with the fifth embodiment, and FIG. 14 is a plan view of a disc drive system to which the disc of FIG. 13 is applied.

As shown in FIG. 13, the disc according to the fifth embodiment is characterized in that an internal gear 33 is provided as an engagement means with the disc drive system. The other components are the same as those as the disc of the first embodiment. The like components are designated by the same reference characters and the explanation therefor will be omitted.

Figure 14:
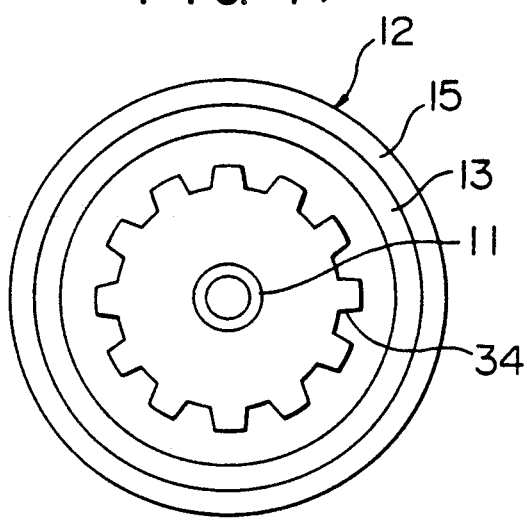
FIG. 14 is a plan view showing a disc drive system for the optical disc according to the fifth embodiment.

On the other hand, as shown in FIG. 14, a spur gear 34 that is engageable with the internal gear 33 is provided in the disc drive system for driving and rotating the disc according to the fifth embodiment.

The disc and the disc drive apparatus according to the fifth embodiment may ensure the same advantages as those of the first and second embodiments.

The disc drive system that has been explained in connection with the second and third embodiments may be applied to the disc according to the fifth embodiment.

Figure 15:
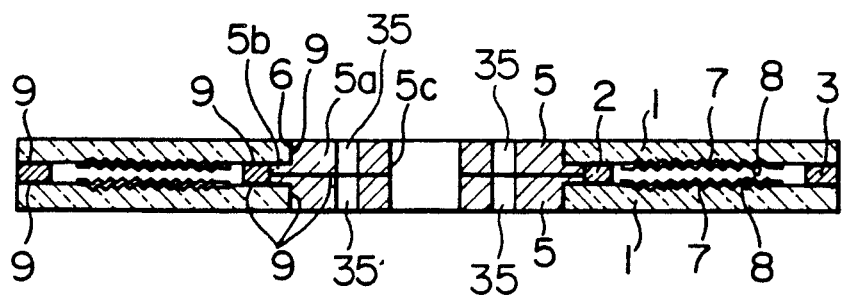
FIG. 15 is a sectional view of an optical information recording disc according to a sixth embodiment.
Figure 16:
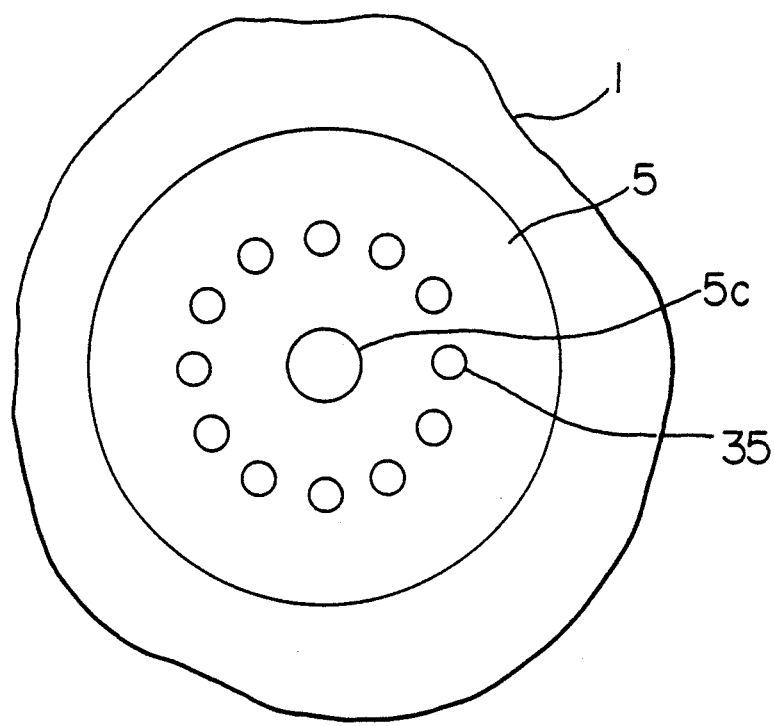
FIG. 16 is a plan view of the optical disc according to the sixth embodiment.
Figure 17:
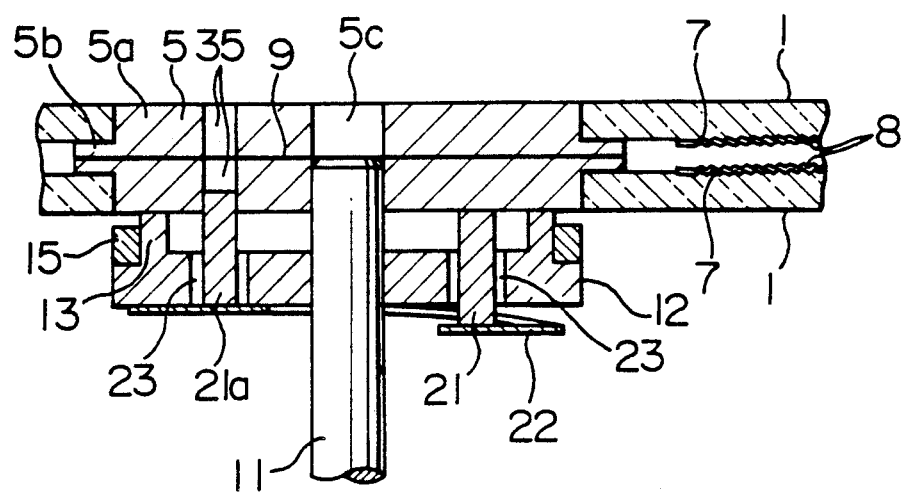
FIG. 17 is a sectional view of an engagement between the disc and the disc drive system according to the sixth embodiment.

A sixth embodiment of the invention will now be described with reference to FIGS. 15 through 17. FIG. 15 is a sectional view of an optical information recording disc in accordance with the sixth embodiment. FIG. 16 is a plan view thereof. FIG. 17 is a sectional view showing the engagement condition between the optical disc and the drive system according to the sixth embodiment.

As shown in FIGS. 15 and 16, the disc according to the sixth embodiment is characterized in that a plurality of penetrating holes 35 are formed in the hub 5 as an engagement means with the disc drive system. The plurality of holes 35 are equiangularly arranged on a coaxial circle in the circumferential portion of the spindle hole 5c. The number of the through holes 35 may be selected as desired. However, in order to smoothly perform the engagement with engagement pin(s) to be described later, it is preferable to increase the number of through holes 35 as many as possible.

The other components are the same as those of the disc according to the first embodiment. The like components are indicated by the same reference numerals and the explanation therefor will be omitted.

The drive system that has been explained in connection with the second and third embodiments may be applied to the disc drive system for rotatably driving the disc according to the sixth embodiment. Namely, as shown in FIG. 17, the engagement pin 21 is engaged with one of the through holes 35 formed in the hub 5, so that the disc may be driven to rotate.

The disc according to the sixth embodiment has the advantage that it may be made at low cost because an expensive gear may be dispensed with, in addition to the like advantages as those of the first through fifth embodiments.

Figure 18:
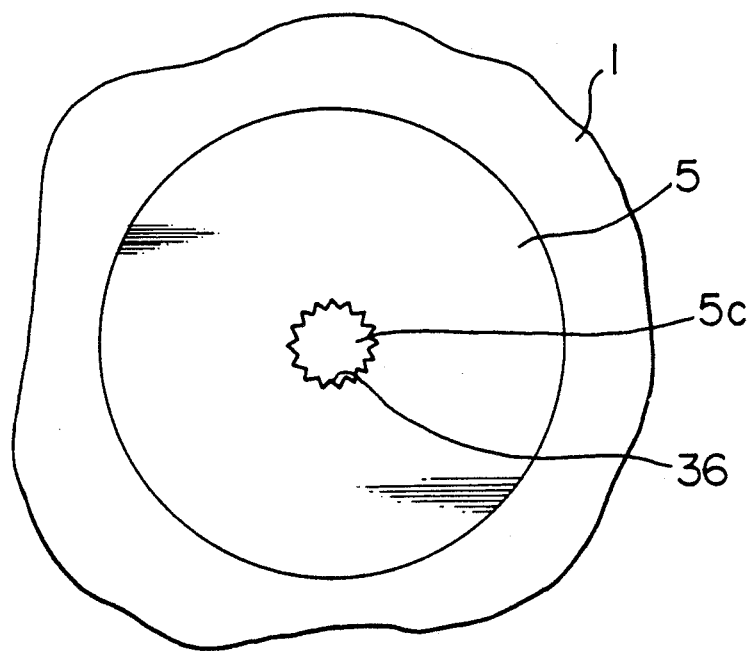
FIG. 18 is a plan view showing an optical information recording disc according to a seventh embodiment of the invention.
Figure 19:
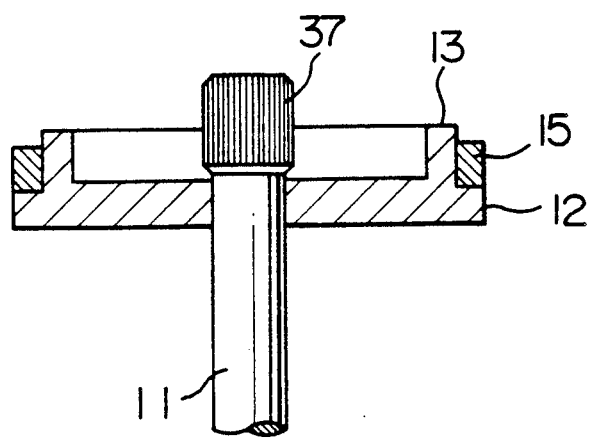
FIG. 19 is a sectional view of a disc drive system for the optical disc shown in FIG. 18.

A seventh embodiment of the invention will now be described with reference to FIGS. 18 and 19. FIG. 18 is a plan view of a main part of an optical information recording disc in accordance with the seventh embodiment. FIG. 19 is a sectional, side elevational view of a disc drive system for the disc of FIG. 18.

As shown in FIG. 18, the disc according to the seventh embodiment is characterized in that a spline 36 is formed in the circumferential wall of the spindle hole 5c formed in the hub 5 as an engagement means with the drive system. The other components are the same as those as the first embodiment. The like components are designated by the same reference characters and the explanation therefor will be omitted.

On the other hand, as shown in FIG. 19, a spline 37 that is engageable with the spline 36 is formed on the spindle 11 of the disc drive system for driving and rotating the optical disc according to the seventh embodiment.

The optical disc according to the seventh embodiment may be rotatably driven without slippage between the spindle 11 and the turntable 12, while being engaged with the drive system through the splines 36 and 37. Therefore, the same advantages as the first embodiment may be ensured by the disc and the disc drive system according to the seventh embodiment.

In this embodiment, it is possible to use a serration instead of the splines 36 and 37 to ensure the same effects.

Figure 20:
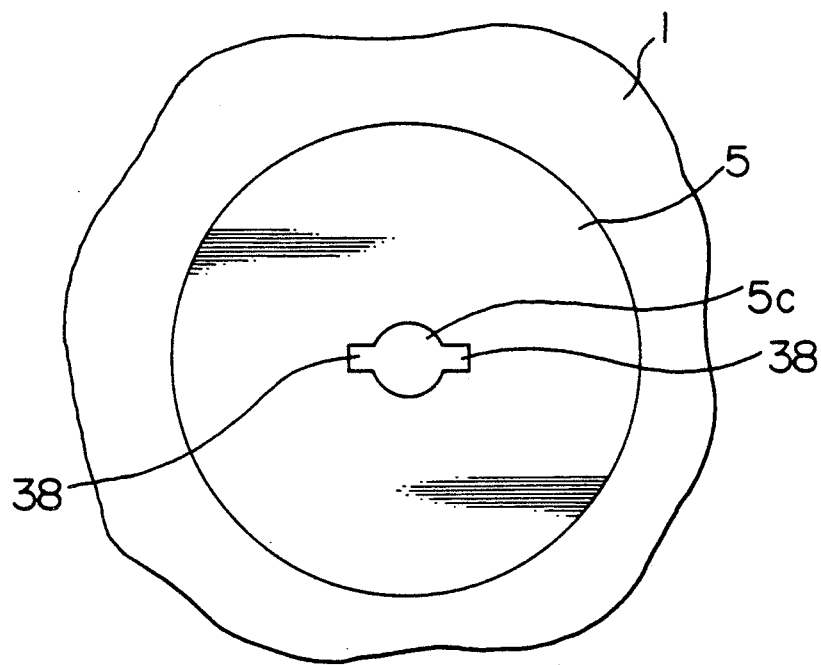
FIG. 20 is a plan view showing an optical information recording disc according to an eighth embodiment.
Figure 21:
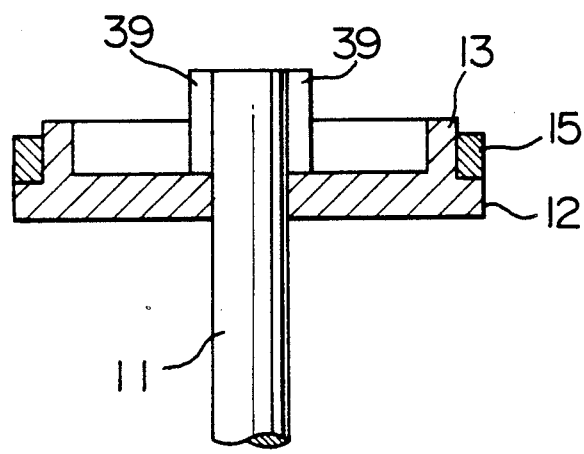
FIG. 21 is a sectional view showing a disc drive system for the disc shown in FIG. 20.
Figure 22:
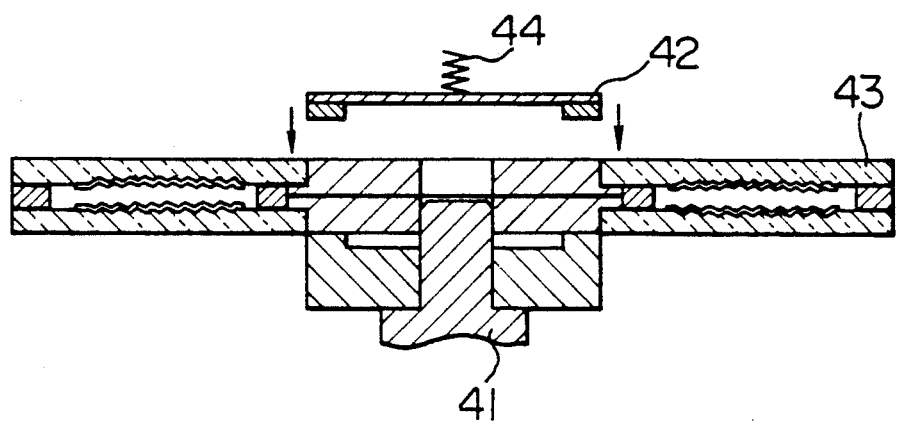
FIG. 22 is a sectional view showing a conventional optical disc.
Figure 23:
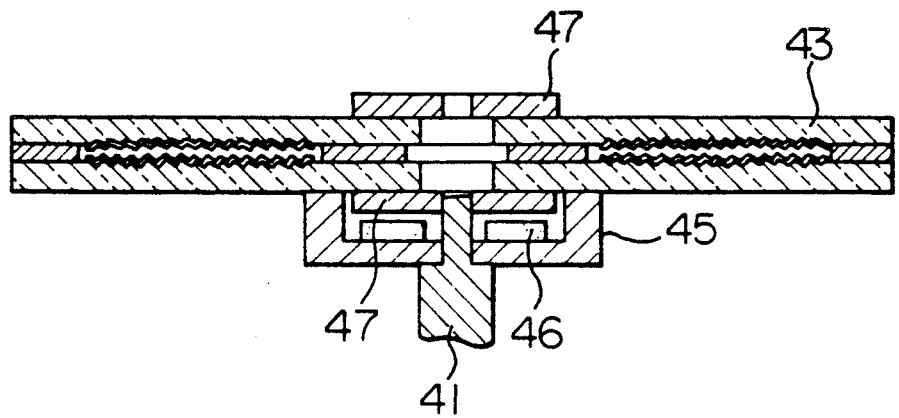
FIG. 23 is a sectional view showing another conventional optical disc.

An eighth embodiment of the invention will now be described with reference to FIGS. 20 and 21. FIG. 20 is a plan view of a main part of an optical information recording disc in accordance with the eight embodiment. FIG. 21 is a sectional, side elevational view showing the disc drive system for the disc of FIG. 20

As shown in FIG. 20, the disc according to the eighth embodiment is characterized in that concave recesses 38 are formed in the circumferential wall of the spindle hole 5c of the hub 5 as an engagement means with the drive system. The other members are the same as the disc of the first embodiment. The like components are designated by the same reference numeral and the explanation therefor will be omitted.

On the other hand, as shown in FIG. 21, projections 39 that are engageable with the recesses 38 are formed on the outer circumferential surface of the spindle 11 in the disc drive system for rotatably driving the disc according to the eighth embodiment.

The disc according to the eighth embodiment is engaged with the disc drive system through the recesses 38 and the projections 39 and is rotatably drive without any slippage between the spindle 11 and the turntable 12. Accordingly, the disc and the disc drive system according to the eighth embodiment may ensure the same effects as those of the first embodiment.

The inventive concept of the present invention resides in the provision of the mechanical engagement means between the disc drive system and the optical disc. The engagement means is not limited to those shown in the first through eighth embodiments.

For example, although the recesses 38 are formed in the hub 5 and the projections 39 are formed in the spindle 11, it is possible to use another arrangement in which the projections are formed from the hub 5 and recesses engageable with the projections are formed in the turntable 12.

Also, the numbers of the recesses 38 formed in the hub 5 and the through holes 35 formed in the hub 5 are not limited to a plural number but may be singular.

Although, in the foregoing embodiments, the hub 5 is provided in the central portion of the substrate 1, the arrangement is not limited thereto or thereby, it is possible to modify the arrangement so that the engagement means explained in conjunction with the first through eighth embodiments may be provided directly to the substrate 1.

Also, in the foregoing embodiments, the optical information recording disc is of the air-sandwich structure type. However, the invention is not limited thereto but may be applied to conventional disc structures such as a single plate type disc and an intimately cemented structure type disc.

As has been described above, according to the present invention, since the disc is mechanically engaged with the disc drive system, there is no slippage therebetween even if a large torque is applied thereto. Therefore, it is possible to increase the starting speed or acceleration of the drive rotation of the spindle and the speed of the drive rotation of the disc. Also, it is possible to reduce recording/reproducing errors and to increase the speed of data transfer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical information recording disc comprising at least one substrate on which information is recorded/reproduced by optical means, said substrate including a spindle hole at a central portion thereof, through which a spindle from a disc drive apparatus can be inserted; and an engagement means as an integral part of said substrate formed coaxially with said spindle hole for engaging a disk engagement means of said disc drive apparatus in a manner such that there is substantially no relative circumferential motion between said respective engagement means, engagement of said respective engagement means taking place at a position other than a cylindrical circumferential face of said spindle.

2. The disc according to claim 1, wherein said substrate is inclusive of a hub made from magnetic material inserted into said spindle hole and said engagement means is formed as an integral part of said hub.

3. The disc according to claim 2, wherein said engagement means comprises a gear-shaped portion formed coaxially with said spindle hole of said hub.

4. The disc according to claim 3, wherein said gear-shaped portion is provided in the shape of a crown gear.

5. The disc according to claim 3, wherein said gear-shaped portion is provided in the shape of a spur gear.

6. The disc according to claim 3, wherein said gear-shaped portion is provided in the shape of an integral gear.

7. The disc according to claim 1, wherein said spindle hole and said engagement means are formed directly in said substrate.

8. The disc according to claim 7, wherein said engagement means of said information recording disc comprises, in a central portion of said substrate, a gear-shaped portion to be engaged with said engagement means of said disc drive apparatus.

9. The disc according to claim 7, wherein said engagement means of said disc substrate comprises at least one recess formed in a circumferential wall of said spindle hole.

10. The disc according to claim 10, wherein said engagement means of said substrate comprises at least one of a penetrating hole and a groove which is adapted to be engaged with at least one projection, to be inserted thereinto, which comprises said disc engagement means.

11. The disc according to claim 10, wherein said engagement means of said substrate comprises at least one penetrating hole.

12. The disc according to claim 10, wherein said engagement means of said substrate comprises at least one groove.

13. A disc drive apparatus for rotatably driving an optical information recording disc, comprising a turntable on which said optical information recording disc is disposed and a spindle immovable relative to said turntable about a circumference thereof, adapted to be fitted in a spindle hole in a central portion of a substrate of said disc, said apparatus including a disc engagement means formed on an upper surface of said turntable coaxially with said spindle for engaging with an engagement means formed integrally with said disc substrate, said engagement of said engagement means of said disc substrate, said engagement means being established at a position other than a cylindrical circumferential face of said spindle.

14. The apparatus according to claim 13, wherein said disc engagement means comprises a gear-shaped portion formed on an optical disc loading surface of said turntable.

15. The apparatus according to claim 14, wherein said gear-shaped portion is provided in the shape of a crown gear.

16. The apparatus according to claim 14, wherein said gear-shaped portion is provided in the shape of a spur gear.

17. The apparatus according to claim 14, wherein said gear-shaped portion is provided in the shape of an internal gear.

18. The apparatus according to claim 13, wherein said disc engagement means comprises at least one projection adapted to project from an optical disc loading surface of said turntable integrally formed with said spindle, said projection intended to engage said engagement means of said optical information recording disc substrate.

19. The apparatus according to claim 17, wherein said disc engagement means includes two projections formed at a position corresponding to a convex portion of said engagement means of said disc substrate and at a position corresponding to a concave portion of said engagement means of said disc substrate.

20. The apparatus according to claim 18, wherein said engagement means of said disc substrate comprises at least one of a penetrating hole and a groove, said at least one projection projecting from said optical disc loading surface of said turntable being inserted into said at least one penetrating hole and groove.

21. The apparatus according to claim 20, wherein said projection is mounted so as to be retractable into said turntable, while being resiliently biased to project from said loading surface.

22. The apparatus according to claim 13, wherein said disc engagement means includes at least one projection projecting outwardly from an outer peripheral surface of an end portion of said spindle.

23. The apparatus according to claim 13, wherein engagement of said engagement means of said substrate with said disc engagement means is adapted to be established after starting the rotation of said spindle relative to said disc substrate disposed on said turntable and before one complete rotation of said spindle.

24. An information recording medium in the form of a disc comprising
a spindle hole in which a spindle of a disc drive apparatus can be fitted, and
an engagement means, selected from at least one member of a group consisting of a hole, a projection, a groove, a recess and a convex portion, for engaging with a corresponding engagement means of said disc drive apparatus constituted by at least one element in addition to a spindle of said disc drive apparatus so that rotation of said spindle of said disc drive apparatus can be transmitted to said information recording medium.

25. A disc drive apparatus for driving an information recording medium in the form of a disc having a spindle hole in which a spindle of the disc drive apparatus is fitted, the disc drive apparatus comprising
a spindle, and a disc engagement means, selected from at least one member of a group consisting of a hole, a projection, a groove, a recess and a convex portion, for engaging with a corresponding engagement means of said information recording medium disc so that rotation of the spindle of said disc drive apparatus can be transmitted to said information recording medium.

26. An engagement structure of an optical disc, for recording therein/reproducing therefrom information by an optical means, with a disc drive apparatus, wherein
the optical disc comprises at least one substrate and a spindle hole therein into which a spindle of said disc drive apparatus can be fitted, and a plurality of engaging portions, arranged circumferentially around said spindle hole, each engaging portion being selected from at least one member of a group consisting of a hole, a projection, a groove, a recess and a convex portion, and
the disc drive apparatus comprises a spindle and a plurality of projections in the form of pins yieldable into a face of a turntable thereof and automatically projectable therefrom, said projections being arranged circumferentially around the spindle, such that
when said turntable is rotationally displaced relative to said optical disc after said optical disc has been disposed on a face of said turntable in such a manner that the spindle is fitted in the spindle hole of the optical disc, at least one engagement is automatically established between at least one of said projections and at least one of said engaging portions of the optical disc.

27. An engagement structure of an optical disc, for recording therein/reproducing therefrom information by an optical means, with a disc drive apparatus, wherein the disc comprises at least one substrate and a spindle hole therein into which a spindle of said disc drive apparatus can be fitted, and a plurality of engaging portions, arranged circumferentially around the spindle hole, each engaging portion comprising at least one member selected from a group consisting of a hole, a projection, a groove, a recess and a convex portion, and the disc drive apparatus comprises a spindle and a plurality of projections in the form of pins yieldable into a face of a turntable thereof and automatically projectable therefrom, said projections being arranged circumferentially around the spindle, such that when said turntable is rotationally displaced relative to said optical disc after said optical disc has been disposed on a face of said turntable in that the spindle is fitted in the spindle hole of the optical disc, at least one engagement is automatically established between at least one of said projections and at least one engaging portion of the optical disc and at least one of the projections is retracted below the face of said turntable, not to be engaged with an engaging portion.

* * * * *